Nov. 1, 1932.    W. EWALD ET AL    1,885,243
DOUBLE DAMPER FOR HEATING AND VENTILATING UNITS
Filed April 25, 1930    3 Sheets-Sheet 1

INVENTOR

Nov. 1, 1932.   W. EWALD ET AL   1,885,243
DOUBLE DAMPER FOR HEATING AND VENTILATING UNITS
Filed April 25, 1930   3 Sheets-Sheet 2
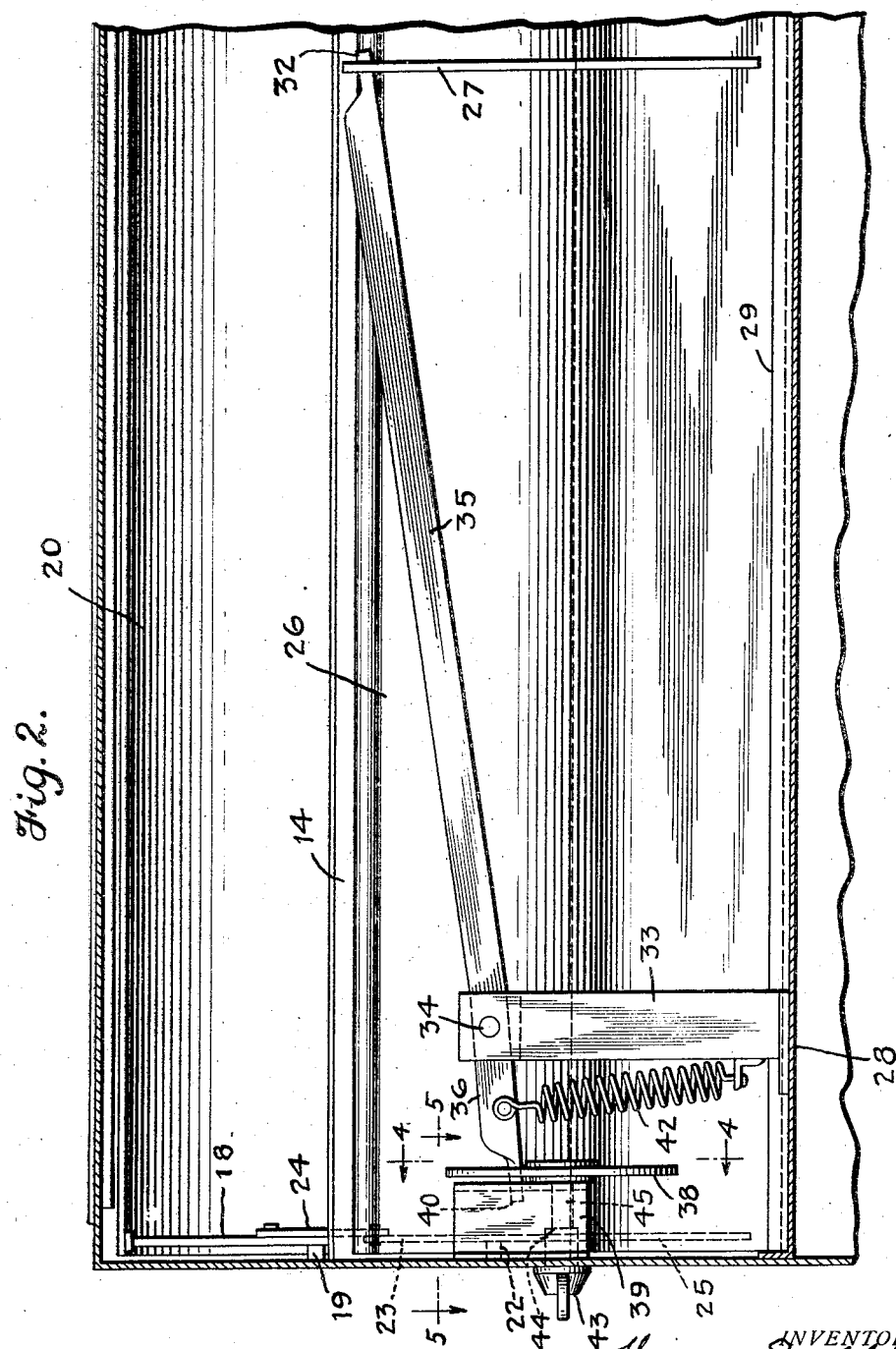

Nov. 1, 1932.   W. EWALD ET AL   1,885,243
DOUBLE DAMPER FOR HEATING AND VENTILATING UNITS
Filed April 25, 1930   3 Sheets-Sheet 3
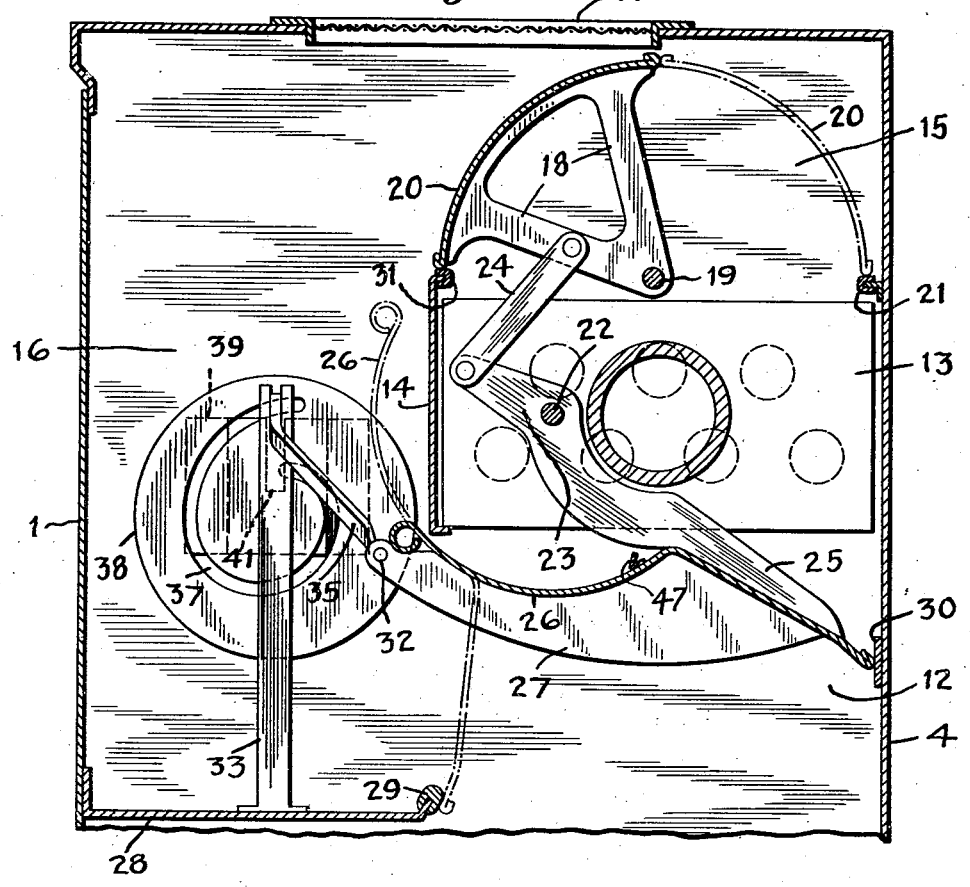
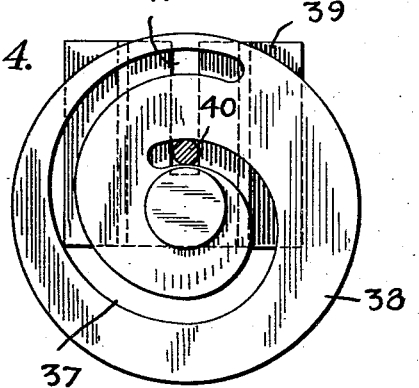
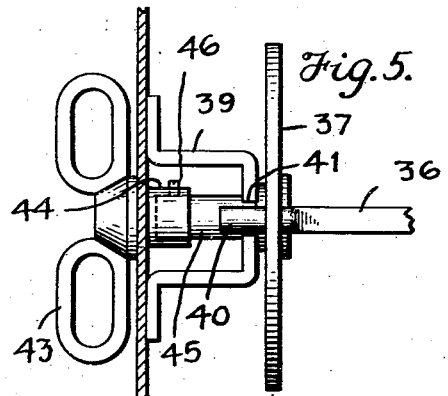
INVENTOR
Warren Ewald
BY Percival F. Hinshall
Chas. McC. Chapman ATTORNEY Patented Nov. 1, 1932

1,885,243

UNITED STATES PATENT OFFICE

WARREN EWALD, OF ARDSLEY-PHILADELPHIA, AND PERCIVAL P. HENSHALL, OF PHILADELPHIA, PENNSYLVANIA, ASSIGNORS TO JOHN J. NESBITT, INC., OF PHILADELPHIA, PENNSYLVANIA, A CORPORATION OF NEW JERSEY

DOUBLE DAMPER FOR HEATING AND VENTILATING UNITS

Application filed April 25, 1930. Serial No. 447,271.

This invention has reference to the art of heating and ventilating, and particularly relates to apparatus for installation in schools, large buildings, offices, churches and other similar structures where it is desired to have pure air and fresh air heated as it is delivered into the room of installation of the apparatus. More specifically, the invention relates to double dampers, adapted for use in heating and ventilating units, and to certain details of construction.

Among the objects of the invention may be noted the following: to provide a heating and ventilating unit with a damper by means of which the radiator or heating element may be entirely covered, or entirely disclosed, or partly covered and partly disclosed, for various functional purposes; to provide a damper of duplex type the parts of which can be operated simultaneously to cover and uncover, or partially cover, the heating element located in the unit; to provide a heating and ventilating unit the heating element of which can be completely covered and isolated so as to prevent any radiation therefrom flowing into the room of installation of the unit or driven thereinto while the heating element is covered; to provide a heating and ventilating unit by which cold air, of outside temperature, can be discharged into the room of installation of the unit without being tempered by hot air or radiation from the heating element; to provide a heating and ventilating unit with interacting means such that the temperature of the room of installation of the unit may be quickly reduced; to provide a damper mechanism by means of which the entire flow of air through the unit may be driven or projected into the room of installation without being retarded, intercepted or caused to regurgitate in the unit or create eddies or turbulence within the unit; to provide a heating and ventilating unit with interacting means such that the air flowing therethrough and being projected at maximum high temperature into the room of installation may be discharged from the unit either in a vertical jet or at a slight inclination with tendency toward the front of the unit; but, when tempered air or cold air is projected into the room of installation of the unit, it will be directed with a tendency toward the back of the unit so as to prevent the occupants of the room from feeling the chill of the air discharged and also to avoid the creation of drafts as the result of the directional projection of the air into the room of installation; and to provide simple means for accomplishing the objects noted in the foregoing which are economical to produce, comparatively light in structure, easily manipulated either manually or automatically, and which are effective for the purposes stated.

With the above objects in view and others which will be detailed during the course of this description, the invention consists in the parts, features, elements and combinations thereof hereinafter described and claimed.

In order that the invention may be clearly understood, drawings have been provided wherein:

Figure 2 is an enlarged sectional view of the top part of the unit, on the line 2—2 of Figure 1;

Figure 3 is a view similar to Figure 1, of the top part of the unit, showing the dampers in another position;

Figure 4 is a front view of controlling disk on the line 4—4 of Figure 2; and

Figure 5 is a plan view on the line 5—5 Figure 2.

Figure 1:
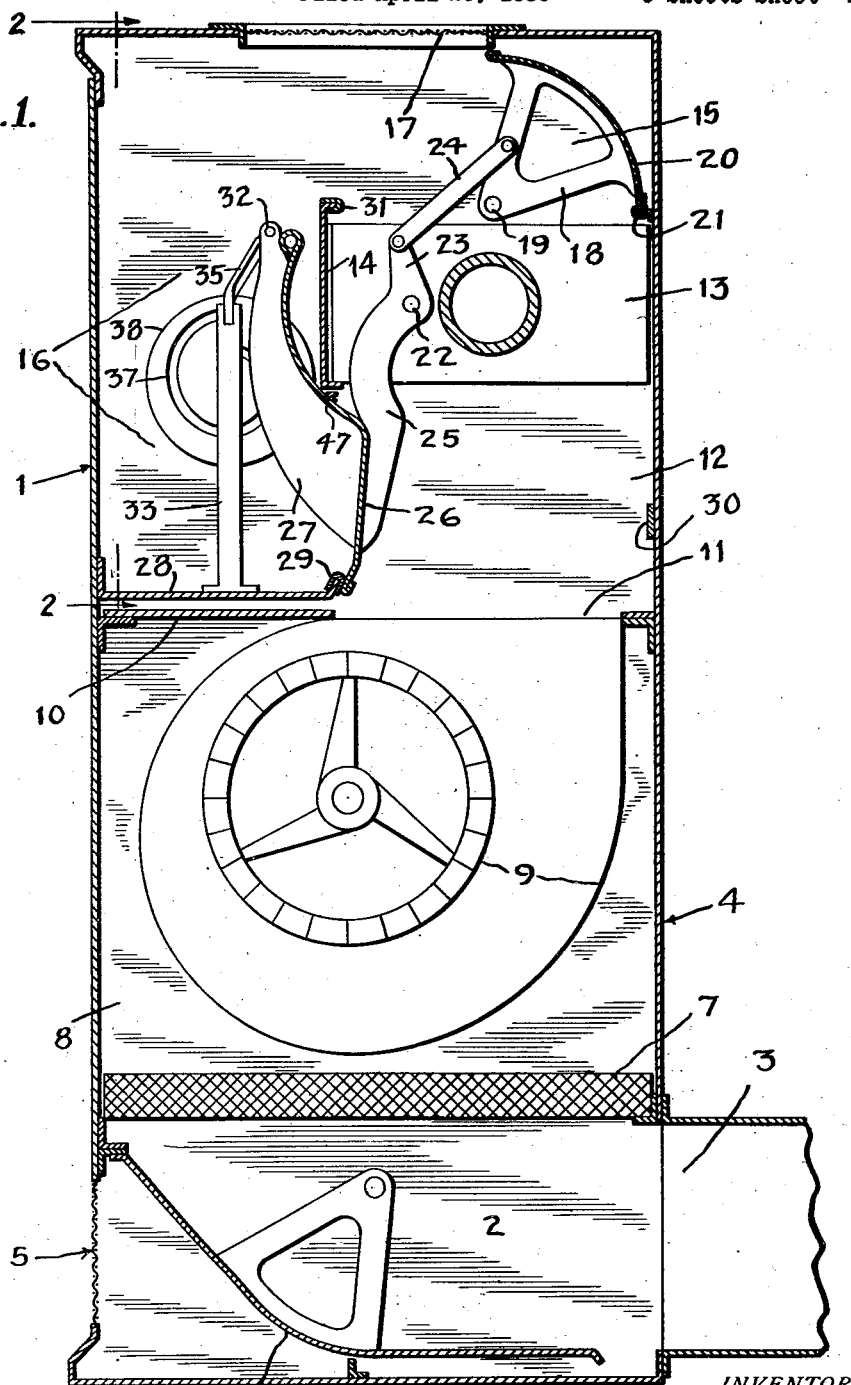
Figure 1 is a view showing a unit in vertical, transverse section embodying the features of invention.

Referring to the drawings, it will be seen that the unit, generally indicated by the numeral 1, is of the usual rectangular form, having back, front, top, bottom and two end or side members made of sheet metal and constructed in economical, strong and durable manner. The interior of the casing is divided into several chambers such as the fresh air chamber 2 located at the bottom of the casing and having a fresh air inlet 3 at the back 4 of the casing, and a recirculating inlet 5 at the front of the casing. The two inlets 3 and 5 are controlled by a recirculating damper 6, which is only incidentally shown because it forms no part of the present invention, it being stated, however, that the damper is adapted to be so shifted as to open the fresh air inlet and simultaneously close the recirculating inlet, or open the recirculating inlet and simultaneously close the fresh air inlet. Thus the unit is enabled to take in fresh air at the outside temperature, or recirculate the air which is in the room of installation of the unit and which, when cold, naturally falls to the floor so as to be drawn into the recirculating inlet by the blowers if in operation.

Just above the chamber 2, a filter 7 is located, the same extending entirely across the top of the chamber 2 and being composed of any suitable media adapted to filter the air, as it passes upwardly to the blowers, with minimum of retardation. Above the filter, the casing is formed into a chamber 8, in which the blowers of centrifugal type are located, being generally indicated at 9, including the casing therefor. There are usually two blowers driven by a motor (not shown) located between the two blowers, the latter being mounted on the motor shaft which is extended for the purpose. The motor and the blowers are underslung; that is to say, are mounted on a supporting member 10 fastened within the casing and forming the top of the blower chamber. From about midway of the casing toward its back the support 10 is provided with an opening or passage 11 through which the casings of the blowers direct the air driven by the latter into the cold air chamber 12. Thus it will be noted that the discharge of the blowers is vertically within the casing at the back of the latter into the cold air chamber 12.

At the top of the cold air chamber 12 there is mounted the heating element 13 which may be of any desired form of radiator, but preferably is of the form composed of light copper tubes connected to headers at opposite ends, one for inlet of heating fluid and the other for outlet thereof, the tubes having disposed thereon between the headers a multiplicity of light, flat, copper radiating plates of any shape desired. For the purposes of the invention herein, the heating element will be referred to as such and the chamber or space occupied by it will be termed the "heating chamber"; and it will be seen that the latter is open at top and bottom and closed at the back, by the back plate of the casing, and closed at the front by a partition 14 also affording support for the heating element. At its bottom the heating chamber communicates with the cold air chamber 12, and at its top communicates with the mixing chamber 15. At the front of the casing, the mixing chamber 15 is connected with the cold air chamber 12 by a by-pass chamber 16. At the top of the casing, which is also the top of the mixing chamber, there is a discharge passage 17 barred by a grille of substantial wire mesh which prevents articles from being thrown into the casing, and also prevents tampering with the interior mechanism.

The duplex damper is located in, and operates in, the cold air chamber, by-pass chamber and mixing chamber. The damper is constructed as follows: The top member of the damper is sector-shaped in form and is generally indicated at 18, and at its vertex is fixed to or mounted upon a rod 19 extending from end-to-end of the casing horizontally near the top of the heating chamber approximately midway thereof. The segmental circumference 20 of the damper extends into the upper back corner of the mixing chamber and rests normally in its open or "hot position" upon a padded stop 21 fixed to the back of the unit casing, this being an extreme position in which it operates also as a shunt for the air driven through the heating chamber, thus preventing eddies being formed in the upper back corner of the casing and preventing turbulence of the air in the top of the casing. Also, by shunting the air from the top back corner of the casing, the hot air is driven through the passage 17 in the top of the casing with a tendency toward the front of the latter, or outwardly into the room of installation of the unit, it being understood, however, that the force of the blowers is sufficient to cause the hot air driven through the heating chamber to be projected approximately vertically from the casing or unit. On a stud 22 secured to one end wall of the casing and extending parallel with the shaft 19, there is mounted a lever, the short arm 23 of which is pivotally connected to a link 24 pivotally connected to one side of the sector-shaped damper 18 above its journal 19. The long arm 25 of the lever is rigidly connected to, or may have integrally formed therewith, a lower damper member 26 provided with a longitudinal strengthening rib 27, said damper being curved at its upper part to clear the partition 14 and extend in front thereof to nearly its top so as to operate freely in the by-pass chamber 16. The lower portion of the damper is bent at an obtuse angle to the upper part of the damper and extends into engagement with a plate 28 mounted on the casing above the support 10, the rear edge of which plate is provided with a pad 29 against which the lower edge of the straight member of the lower damper contacts and normally rests in the open or "hot position" of the duplex damper, as shown in Figure 1. In the "cold position" of the duplex damper, shown in Figure 3, the bottom of the lower member of the duplex damper 26 contacts with a wear plate and pad 30 secured to the back of the casing, while the front edge of the upper member 20 of the duplex damper contacts with and rests upon a stop and pad 31 at the top of the partition 14. The upper end of the rib 27 is provided with an aperture for the connection of the control lever.

The control lever and an example of its operating mechanism is located in the by-pass chamber 16 and extends parallel, approximately with the journal 19 of the sector-shaped member of the duplex damper. The control lever is mounted in an upright 33 secured to the support 28 at the bottom of the by-pass chamber, the pivotal mounting of the lever at 34 being quite loose, and so located as to provide an extremely long arm 35, and a comparatively short arm 36 for said lever. The inner end of the arm 35 of the lever is reduced at 32 so as to loosely enter and extend through the aperture in the rib 27 of the lower member of the duplex damper and the outer end of the short arm 36 of the control lever is also reduced to extend through the scroll slot 377 of an adjusting disk 38 journaled upon the bracket 39 fixed to the inside of one end wall of the casing. The reduced portion 40 of the short arm 36 of the lever also extends into a vertical slot 41 of the bracket 39, thus enabling the movement of the outer end of the lever to be properly controlled during the actuation thereof by the scroll slot 37. The end 40 of the slot arm of the lever is held in contact with the wall of the groove 37 by means of a tension spring 42, one end of which is hooked upon the arm 36 of the lever and the lower end of which is hooked upon a bracket near the base of the upright 33. As an example of an operating means for the disk 38, for manual control of the duplex damper, a handle or butterfly nut 43 is connected by its hub 44 journaled in and extending through the end plate of the casing, to which hub the journal 45 of the scroll disk 38 is rigidly connected, as by entering the said hub 44 and being fixed thereto by a set screw 46. Thus, upon turning the butterfly nut or handle 43, the disk will be rotated and the scroll slot of the latter will manipulate the end 40 of the controlling lever, which in turn will be given a reciprocation corresponding with the movement imparted to the lower member 26 of the duplex damper. The curved portion of the lower member 26 of the damper, near its junction with the lever arm 25 may be provided with a stop member 47, padded, if desired, to contact with the lower edge of the front partition 14 of the heating chamber, to prevent overthrow of the lever and the impact of the member 26 against said partition from creating undue noise should the damper be too vigorously operated.

From the foregoing detailed description the following mode of operation will be understood: With the motor in operation and the blowers driven thereby, air will enter or be drawn into the bottom of the casing. Normally, the fresh air inlet 3 will be open to outdoors so as to receive fresh air at outside temperature, and the recirculating inlet 5 will be barred. The blowers will draw the air through the filter 7 into the blower chamber 8, the air entering at the eyes or axes of the blowers and being driven and guided by their casings vertically through the opening 11 into the cold air chamber 12 and through the radiator and hot air chamber 13, if the duplex damper be in its extreme "hot position" shown in Figure 1, into the mixing chamber 15 and through the grille at the opening 17 in the top of the casing. In this position of the parts, all the air entering the unit will pass through the heating chamber and heating element thereof, or in contact with the members of the latter so that, according to the temperature of the latter, the air discharged from the top of the casing will be heated to the degree desired. If the room of installation becomes too hot and it is desired to reduce the temperature thereof, the handle 43 will be turned, causing the control lever 35—36 to operate upon the lower member of the duplex damper 26, thus shifting it downwardly and inwardly in a curved path toward the back of the casing, this action causing the lever 23—25 to shift the upper member 18 of the duplex damper, by the link connection 24, forwardly toward the front of the casing in a curved path. An extreme adjustment of the members 18—26 is shown in Figure 3. In this position the heating element is entirely covered at top and bottom, and no heat can radiate therefrom and no air can pass therethrough. All the air, therefore, entering the cold air chamber 12 is directed through the chamber 16, completely by-passing the heating element, and is discharged at outside temperature through the top of the casing into the room of installation. This provides for a quick reduction in temperature of the room. The cold air is not driven out into the room or toward the front of the casing because, in its passage through the by-pass chamber 16, the air is deflected against the front wall or panel of the casing, by the member 26 of the damper, from which it is deflected inwardly and upwardly within the casing into contact with the top of the casing at its front and into contact with the curved surface 20 of the upper member of the duplex damper. This causes, within the mixing chamber, at the front thereof, considerable turbulence resulting in the air being discharged from the casing vertically but with a general tendency toward the back of the casing and against the room wall, from which it is deflected to the ceiling and in turn deflected downwardly into the room of installation and toward the opposite wall of the latter. Thus, drafts within the room are eliminated and the cold air driven from the unit is not projected upon or directed toward the occupants of the room.

If the temperature of the room of installation of the unit is to be reduced gradually, the handle 43 will be shifted to the extent desired for the location of the two members of the duplex damper with reference to the top and bottom of the heating element. In any intermediate position between the two extremes shown in Figures 1 and 3, the two damper members will partly cover the top and bottom of the heating element enabling part of the cold air driven by the blowers to pass through the heating chamber and through the by-pass chamber. Intermediate adjustments, between the two extremes, can be so made as to regulate the amount of cold air, passing through the heating chamber and through the by-pass chamber, to a nicety and thus regulate the temperature of the air discharged from the unit and the temperature of the room of installation of the unit, also to a nicety. In fact, by being able to completely cover and isolate the heating element, through the medium of the duplex damper, hot air radiation from the heating element is prevented in any direction within the casing; and by being able to regulate the position of the two members of the damper relatively to the top and bottom of the heating chamber, the temperature of the air driven from the unit can be regulated to within a fraction of that desired for the control of the temperature in the room of installation of the unit. The form of the damper and the ability to manipulate it as described, and cause it to produce the functions noted in the foregoing, are among the important features of the invention.

In the foregoing description has been given of a duplex damper operating under manual control; but, by few and simple changes well known in the art, the damper can be operated by automatic means under thermostatic control. The thermostatic controlling means may be made to operate, as is common in this art, a sylphon motor of the Johnson or Powers type suitably connected to the controlling lever. It is thought unnecessary to illustrate such means, and especially in view of the fact that the invention resides more particularly in the duplex damper and its functions in, and in combination with, a unit of the type shown.

While the double damper, as disclosed, is of a form which entirely covers the heating element at its bottom, and in its two positions at the top of the heating element covers only a portion of the latter, the functional effect of the top member of the damper in cooperation with the unit casing is to entirely shut off radiation from the heating element when the damper members are in the position shown in Figure 3; and it will be seen that the effects desired are contributed to by reason of the fact that no air can enter the heating element at the bottom because the lower member isolates the heating element completely, and also because the angular top portion of the casing at its back cooperates with the upper member of the damper to shut in the heating element.

What we claim and desire to secure by Letters Patent is:

1. A heating and ventilating unit having, in combination, a heating element and a duplex damper cooperative with said element the members of which are independently pivotally mounted and one member of which is sector-shaped and the other member of which is obtuse angular, linkage between the two members, and means for actuating the said members including a lever, a disk cooperating with the lever having a scroll slot, and means for rotating the disk.

2. A heating and ventilating unit having, in combination, a heating element located at its back, an arcuate damper pivotally mounted above the heating element midway between the front and back thereof, and means for giving the damper circular movements whereby at one time it may shut off the corner of the casing above the heating element and deflect air passing from the latter toward the front of the casing and at another time it may shut off the passage of air through the radiator and prevent radiation therefrom.

3. In combination with the heating element of a unit apparatus, a damper arcuate in form and pivotally mounted centrally of the heating element over the top thereof, and means for actuating the damper to swing it from edge to edge of said element, whereby it may perform the double function of deflecting the air passing through the heating element and the shutting off radiation from the heating element.

WARREN EWALD.
PERCIVAL P. HENSHALL.